(12) United States Patent
Tolani et al.

(10) Patent No.: US 9,311,655 B2
(45) Date of Patent: Apr. 12, 2016

(54) DISPLAY OF LOCATION-RELATED PROMOTIONAL MESSAGE WITH SEARCH QUERY RESULTS

(71) Applicant: Yahoo! Inc., Sunnyvale, CA (US)

(72) Inventors: Anand Tolani, Sunnyvale, CA (US); Farzin Maghoul, Hayward, CA (US)

(73) Assignee: Yahoo! Inc., Sunnyvale, CA (US)

( * ) Notice: Subject to any disclaimer, the term of this patent is extended or adjusted under 35 U.S.C. 154(b) by 140 days.

(21) Appl. No.: 13/651,262

(22) Filed: Oct. 12, 2012

(65) Prior Publication Data

US 2014/0108447 A1   Apr. 17, 2014

(51) Int. Cl.
*G06F 17/30* (2006.01)
*G06Q 30/02* (2012.01)

(52) U.S. Cl.
CPC ........ *G06Q 30/0256* (2013.01); *G06Q 30/0261* (2013.01); *G06Q 30/0267* (2013.01)

(58) Field of Classification Search
CPC .................... G06F 17/30241; G06F 17/30696; G06F 17/30699; G06Q 30/02

USPC .................................. 707/707, 713, 765, 766
See application file for complete search history.

(56) References Cited

U.S. PATENT DOCUMENTS

| | | | |
|---|---|---|---|
| 5,918,009 A * | 6/1999 | Gehani et al. ................. | 709/219 |
| 6,128,571 A * | 10/2000 | Ito et al. ......................... | 701/426 |
| 6,320,518 B2 * | 11/2001 | Saeki et al. ............... | 340/995.18 |
| 7,747,648 B1 * | 6/2010 | Kraft et al. ..................... | 707/790 |
| 2004/0039523 A1 * | 2/2004 | Kainuma et al. .............. | 701/208 |
| 2004/0193420 A1 * | 9/2004 | Kennewick et al. .......... | 704/257 |
| 2004/0254723 A1 * | 12/2004 | Tu ............................ | 340/995.19 |
| 2004/0260465 A1 * | 12/2004 | Tu ................................. | 701/209 |
| 2005/0288851 A1 * | 12/2005 | Yokota ........................ | 340/995.1 |
| 2006/0271281 A1 * | 11/2006 | Ahn et al. ..................... | 701/208 |
| 2007/0106468 A1 * | 5/2007 | Eichenbaum et al. ........ | 701/211 |
| 2008/0005055 A1 * | 1/2008 | Horvitz ........................... | 706/62 |
| 2008/0140309 A1 * | 6/2008 | Jendbro ........................ | 701/201 |
| 2009/0055092 A1 * | 2/2009 | Yokota ......................... | 701/208 |
| 2011/0137880 A1 * | 6/2011 | Blais ............................ | 707/706 |

* cited by examiner

*Primary Examiner* — Vincent F Boccio
(74) *Attorney, Agent, or Firm* — Berkeley Law & Technology Group, LLP

(57) ABSTRACT

Briefly, embodiments of methods or systems for display of a location-related promotional message with search query results are disclosed.

20 Claims, 3 Drawing Sheets

DISPLAY OF LOCATION-RELATED PROMOTIONAL MESSAGE WITH SEARCH QUERY RESULTS

BACKGROUND

1. Field

This disclosure relates to generating and/or displaying promotional messages, such as advertisements, in addition to results of search queries 2. Information If a user submits a search query, a computerized search engine may respond by providing a list showing establishments, locations, documents, and/or other results that may be relevant to a submitted query. The use of search engines may allow a user to obtain dozens of search results, for example, which may permit the user to determine availability of a desired product or service within a short period of time. This may allow a user to obtain a product or service with a single, brief trip to an establishment, such as a supermarket, grocery store, hardware store, etc., at which the user may have some assurance that the desired product or service will be available. In some instances, in addition to determining availability of a product or service, a user may additionally determine price and/or other terms from results of a search query.

However, as beneficial and highly regarded as search engines have come to be, some managers and/or operators of smaller businesses may have difficulty grasping complexities associated with achieving a web presence to enable the business to be represented in search query results in a desired manner. In some instances, while maintaining intense focus on providing quality products and/or services, operators of smaller businesses may be uncomfortable with technology and/or tools available for web-related promotion of a business. As a result, owners and/or operators of smaller businesses may maintain only a limited web-presence, or may choose to outsource responsibility for development of a web-related aspect of the business to a third party. Unfortunately, considering that third parties may only partially understand subtleties of products or services offered by a smaller business, for example, success of web-related aspects of the business may be elusive and/or may result in unnecessary expense for the business.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
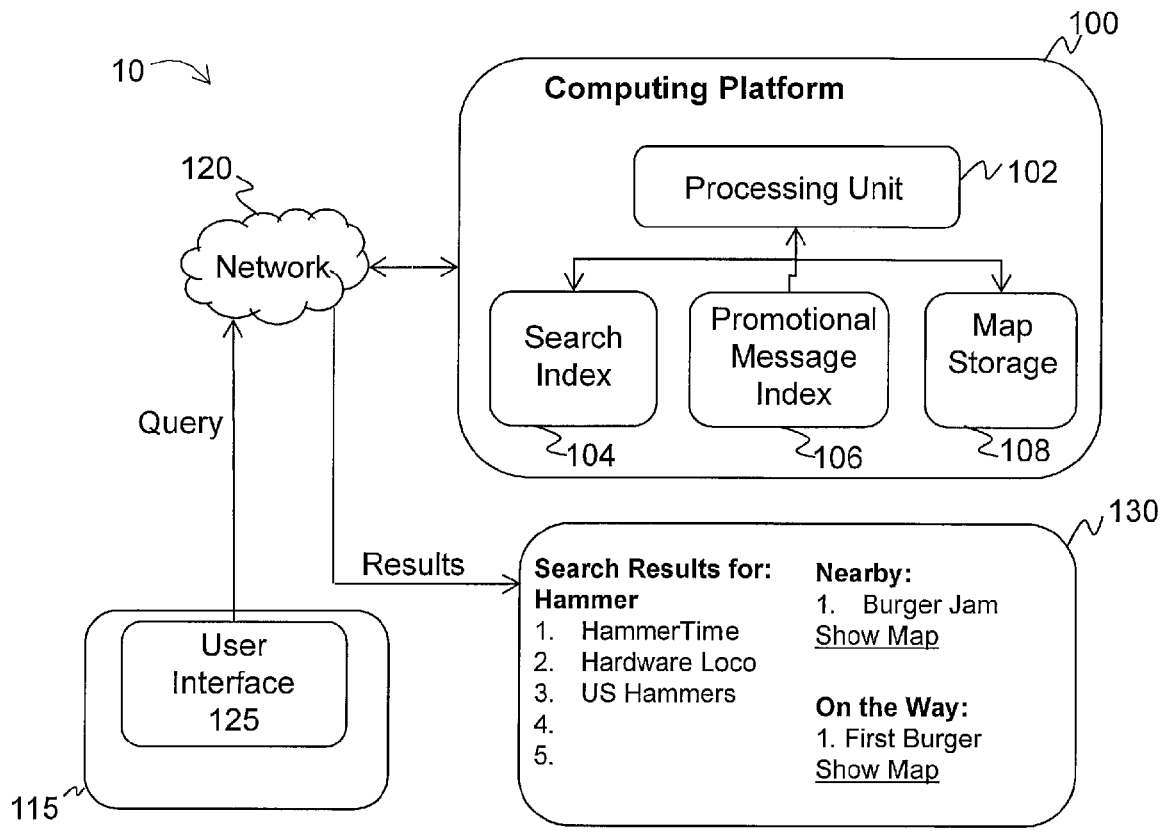
FIG. 1 is a schematic diagram of a system for displaying location-related promotional messages together with search query results according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

Reference throughout this specification to "one example," "one feature," "one embodiment," "an example," "a feature," or "an embodiment" means that a particular feature, structure, or characteristic described in connection with the feature, example, or embodiment is included in at least one feature, example, or embodiment of claimed subject matter. Appearances of the phrase "in one example," "an example," "in one implementation," "an implementation," "an embodiment," or "in one embodiment" in various places throughout this specification are not necessarily all referring to the same feature, example, or embodiment. Furthermore, particular features, structures, or characteristics may be combined in one or more examples, features, or embodiments.

Media networks, such as the Yahoo!™ network, for example, are increasingly seeking ways to attract users to their networks and/or to retain users within the network for extended periods of time. A media network may, for example, comprise an Internet website or group of websites having one or more sections, for example. For instance, the Yahoo!™ network includes websites located within different categorized sections, such as sports, finance, current events, and games, to name just a few non-limiting examples among a variety of possible examples.

The more users who remain within a media network for an extended period of time, the more valuable a network may become to potential advertisers and, typically, the more money advertisers are inclined to pay to advertise to users, for example, via that media network. In an implementation, searching or use of search engines, often provided to a user of a client device via a server or other type of computing platform located within a processing and/or communications infrastructure of a media network may deliver relevant content or links, such as hyperlinks, to relevant content that may entice users accessing content to remain within a network for a relatively extended period of time. Links to content, such as to websites located outside of a media network, may also be presented to users. Thus, even if users are directed to websites outside of a particular media network, users may remain loyal to the media network in the future if they believe that the network provides links or otherwise directs them to relevant content as a result of submitting a search query. In this context, the term content includes, as examples, images, video, audio, text, and/or multimedia, such in the form of stored physical states or in the form of electronic signals, for example.

A search engine may be employed to enable users to gain access to content and/or access to local providers of goods and/or services. For example, a user may exploit a search engine to determine attributes of a local business or other establishment, such as hours of operation, product lines and/or service offerings, parking, pricing information, daily specials, terms and conditions of goods and/or services provided, etc. In some respects, a search engine may be thought of as having replaced a local telephone directory as a leading resource used by customers or other patrons to become familiar with details of products and/or services offered by local establishments, for example.

According to one or more implementations discussed herein, for example, if a user submits a search query to obtain information relevant to local establishments, a search engine may provide search results showing establishments having relevance to user-submitted search terms. In certain implementations, for example, a user may submit a search corresponding to a particular business name, such as, for example, "Joe's Pizza," or may submit a search corresponding to a particular product, such as "Where can I buy a hammer in San Jose?" In addition to a listing of local establishments presented in descending order of relevance, for example, a search engine may additionally supply access to content, such as links, for example, relevant to establishments having a geographical relationship to one or more local establishments listed in search results. In one possible example among many possible examples, if a search engine returns a name and/or address of a local business, a search engine may additionally return a promotional message for an establishment within a particular radius of a local business or perhaps along a route from a search engine user's estimated location to a local business. It is noted, of course, that the location of a hardware platform may be employed to estimate the user's location in an embodiment.

As the term is used herein, an "establishment" may correspond to one or more businesses or other entities, such as those at which goods and/or services may be provided. For example, an establishment may correspond to a business at which food and/or drink items may be purchased, such as restaurants, bars, cafés, grocery stores, and so forth. An establishment may also correspond to a business at which services may be provided, such as barbershops, salons, spas, day care centers, hospitals, hotels, parking garages, repair shops for automobiles and/or other durable goods, and so forth. An establishment may correspond to a business at which relatively durable items may be purchased, such as hardware stores, clothing stores, boutiques, and so forth. An establishment may correspond to an entertainment-related or cultural venue, such as a movie theater, zoo, park, beach, national monument, historical site, museum and so forth. Accordingly, an establishment may include a wide variety of locations at which goods, services, entertainment, cultural enrichment, recreation, or any other tangible article of interest (e.g., a material item that is a subject of a transaction) or an intangible article of interest (e.g., an experience, an encounter, and/or an event), may be obtained, as well as others, or combinations thereof, and claimed subject matter is intended to embrace all such locations.

As the term may be used herein, a "promotional message" may correspond to content, such as, an advertisement, marketing information, public relations statements, or other mechanisms that may promote an establishment, including, for example, images, audio, video, text, multimedia, or combinations, in a reasonably concrete form, such in the form of stored physical states or in the form of electronic signals, for example. As will be explained more fully in relation to FIG. 2, an establishment may purchase advertising space adjacent or nearby to search results so that if a desired first establishment is listed among search results, a promotional message for second establishment having a geographical relationship with the first establishment may be displayed. Thus, a user visiting a first establishment, such as, for example, a theater or other venue returned in a search result, may be inclined to visit a second establishment such as a nearby restaurant or bar, for example, after visiting the first establishment. In some implementations, an owner and/or operator of an establishment may pay a search engine provider so that if a second establishment is returned as a search result, a promotional message pertaining to a first establishment may be displayed alongside a returned search result.

As the phrase may be used herein, a "geographical relationship" may correspond, for example, to a first establishment and a second establishment being proximate to one another, such as within a range of 1.0 km, 2.0 km, 5.0 km, or other specified range. First and second establishments may be located on corresponding streets (e.g. located on Main Street, Hollywood Boulevard, Pacific Coast Highway, Route 1, or other common access routes), for example, or may be located on blocks or streets different from one another, but nonetheless reasonably proximate. A geographical relationship may correspond to a second establishment being along a travel route that may be used to access a first establishment appearing in a search query initiated from a particular estimated location, for example. In this context, a geographical relationship may imply that at least a portion of a travel route from a particular "estimated location," to a first establishment may be computed. In implementations, determining an estimated location may result, at least in part, in generation of a travel route, which may include driving directions, an estimated time of arrival, and so forth, from a particular estimated location to an establishment.

A particular estimated location may be associated with, for example, a physical location of an Internet protocol address at which a search query may have been initiated, such as using a client device, as one example. An estimated location may be associated with a physical location, such as a street address, or perhaps some other identifying attribute which may, at least in part, enable a capability to at least approximately specify an area from which a search query may have been initiated. An estimated location may result from a wireless communications network, for example, employing any one of several signal processing related position and/or location estimation technologies, such as advanced forward-link trilateration (AFLT), observed time difference of arrival (ODTOA), enhanced cellular identification (ECID), or combinations thereof, just to name a few examples. However, it should be noted that any number of techniques may be used to compute travel routes and/or determine geographical relationships between establishments, and claimed subject matter is not intended to be limited to these examples, which are provided simply as illustrations.

FIG. 1 is a schematic diagram of a system for displaying location-related promotional messages together with search query results according to an embodiment 10. In FIG. 1, computing platform 100 may receive a query by way of network 120. A query may be formulated, for example, by way of an interface, such as graphical user interface or other user interface, illustrated for example, by 125. In some embodiments, an interface, such as a user interface, may include one or more peripheral devices, such as a keyboard, mouse, and/or other device or devices which may be employed to initiate one or more search queries via a computing platform (e.g., client computing device). In one or more implementations, one or more queries may be communicated (e.g., transmitted) via a network, such as 120, which may represent the Internet, a corporate network, or another type of wired or wireless network (or combination thereof), such as from a client computing device, for example, such as 115, to computing platform 100 (e.g., one or more servers) wherein a query may be processed, for example. As a non-limiting illustration, computing platform 100 is depicted as including a processing unit (e.g., processor) 102 capable of executing software code, for example, resulting in query processing, in an embodiment. Query results may be communicated (e.g., transmitted) from computing platform 100 back to client computing device 115 by way of intervening network 120, for example, so that results may be displayed, such as illustrated in FIG. 1 by 130. It should be noted, however, that the particular arrangement of FIG. 1 illustrates one of a host of various possible architectures capable of being employed perform query processing. Therefore, claimed subject matter is, of course, not limited in this regard.

In an implementation, such as that of FIG. 1, for example, a query, such as may be received by computing platform 100, for example, may comprise any number of search terms. In one possible example among many, a user interested in shopping for a hammer may submit a query that comprises a particular term, such as "hammer," although nothing prevents more sophisticated queries comprising additional search terms, such as queries regarding particular types of hammers, particular sizes of hammers, particular price ranges of hammers, particular compositions of material comprising a hammer, combinations thereof, and so forth.

If a query, such as, for example, comprising "hammer" or a similar query relating to hammers, is received at computing platform 100, processing unit 102 may execute code, for example, to parse the received query, such as, for example, in accordance with one or more processes for implementing a search engine, such as may be executed by processing unit 102, for example. Again, as previously noted, computing platform 100 may comprise multiple computing platforms, such as one or more servers. Likewise, the servers may be in communication for processing of a search query via a network.

However, for ease of explanation, here, a more simplified discussion in terms of computing platform 100 will be continued without any loss of generality. Thus, processor or processing unit 102 may execute code to access a search index 104, for example, which may indicate one or more examples of stored content, which may include examples of business establishments. Thus, for example, establishments having attributes that correspond to terms or aspects of a search query may be returned in a descending order of relevance, for example, in a manner similar to results shown displayed by 130. Assume in this illustrative example, a search query comprising a term "hammer" may result in at least three establishments, "HammerTime," "Hardware Loco," and "US Hammers" being displayed at 130. Although three search results are shown, of course, any number of search results may be displayed, and claimed subject matter is not limited in this regard.

In addition to search results that may be relevant to a submitted search query, promotional messages may also be displayed, for example, in an embodiment. In the example of FIG. 1, at 130, for example, an establishment, such as a restaurant named "Burger Jam" having a geographical relationship with the search result "HammerTime' may be displayed, for example, alongside one or more search results. A "Show Map" link, which may represent a hyperlink, may also be displayed to permit quick access to a map showing the location of "Burger Jam" relative to surrounding establishments and/or landmarks. Displayed results 130 of FIG. 1 are also shown as displaying a promotional message "First Burger," which may also represent an establishment having a geographical relationship with the search result HammerTime. Although two promotional messages are illustrated in FIG. 1, claimed subject matter is not limited in this regard. Again, this is merely an illustrative example and it is not intended that claimed subject matter be limited to illustrative example. Thus, additional promotional messages (or fewer) may be displayed in other implementations; likewise, additional approaches to displaying promotional messages may be employed.

Promotional messages to be displayed may be read from a promotional message index, such as 106, for example, in accordance with electrical signals or physical states, for example, from map storage 108. In one or more implementations, for example, a processor may execute code able to determine one or more geographical relationships, if applicable, between query search results and establishments having corresponding to promotional messages, such as by using route content, available, in this example implementation, from map storage 108. As previously indicated, FIG. 1 represents a simplified architecture for purposes of illustration. Thus, for example, one or more implementations may comprise additional components, such as power supplies, memory controllers, switches, routers, etc. as may be appropriate. Further, claimed subject matter is not limited in scope to a simplified example provided as an illustration.

Figure 2:
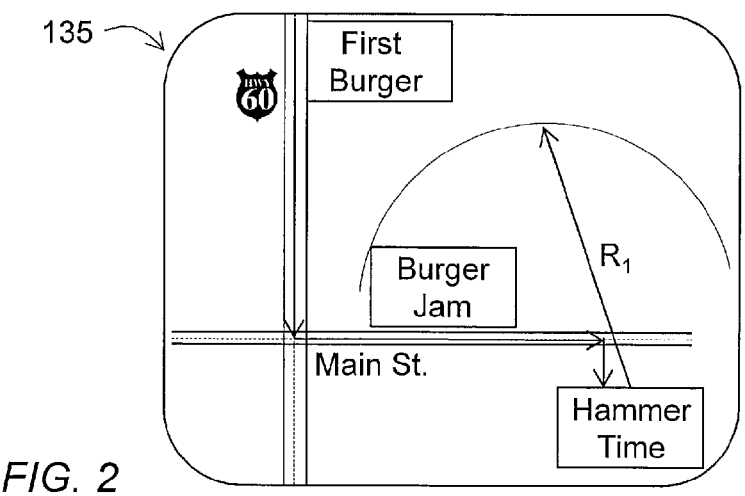
FIG. 2 is a representation of a display showing location-related promotional messages with search query results according to an embodiment.

FIG. 2 is a simplified representation of a depiction, here designated as 135, that may appear on a display, showing location-related promotional messages with search query results according to an embodiment. Depiction 135 may result, for example, from selecting a "Show Map" link on a search results page, such as illustrated by 130 of FIG. 1, for example. However, in other implementations, location-related promotional messages or associated establishments, for example, may be displayed through other mechanisms. For example, a map showing one or more search results may be displayed as a result of a search query without selecting a link.

As represented on depiction 135, a restaurant titled "Burger Jam" is shown as being located within a radius of $R_1$ of "HammerTime." In some implementations, $R_1$ may correspond to a specified range of perhaps 1.0 km, 2.0 km, 5.0 km, and so forth. In other implementations, R1 may correspond to a specified range of a smaller or a larger magnitude, such as, 100 m, 500 m, and so forth, or 7.5 km 10 km, and so forth.

Accordingly, in an example, such as FIG. 1, since restaurant "Burger Jam" is reasonably proximate with "HammerTime," one conducting a search query, for example, as previously described, may be inclined to visit "Burger Jam" on his or her way to "HammerTime." It should be noted, however, that although "Burger Jam" has been illustrated as being located on a travel route (e.g., on Main Street) nearby "HammerTime," nothing prevents an establishment from being identified with search results despite not necessarily being located on a travel route or even nearby an establishment identified in search results. As one non-limiting example, other establishments may be located on a different street or avenue than Main Street.

FIG. 2 also shows "First Burger" located on Highway 60 which may, for example, be located on a travel route between an estimated location and another establishment, e.g., "HammerTime," in this example. The establishment "First Burger" may be located, for example, 10.0 km, 15.0 km, 20.0 km, or an even greater distance from "HammerTime," such as greater than 25.0 km, just as an example. Accordingly, a geographical relationship between "First Burger" and "HammerTime" may, instead, in this example, result from "First Burger" being situated along or at least proximate to a travel route between an estimated location and an establishment included in search results. It should be noted, however, that a geographical relationship may be recognized between two establishments under a variety of other circumstances, and claimed subject matter is not limited in this respect.

In particular implementations, a promotional message pertaining to a first establishment may be displayed, for example, according to rules limiting such display to certain times of the day, certain days of the week, during certain other time frames, or various combinations thereof. For example, if "First Burger" is located along a travel route to "Hammer-Time," promotional messages pertaining to "First Burger" may be displayed as a result of queries initiated during hours of operation, such as from 9:00 AM until 10:00 PM, but not otherwise. In other implementations, for example, if "First Burger" is closed on Sundays, promotional messages pertaining to "First Burger" may not necessarily be displayed as a result of queries submitted on Sundays. In still other implementations, "First Burger" may limit promotional messages to queries submitted during hours approaching lunch, so as to promote First Burger during, for example, more profitable and/or desirable hours.

Figure 3:
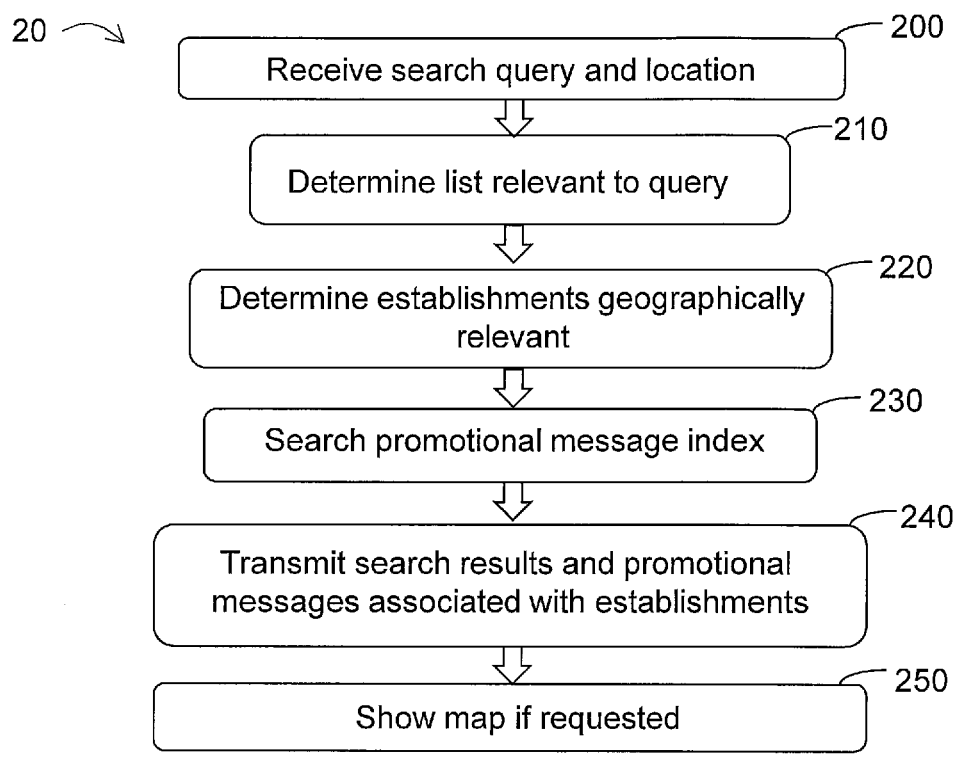
FIG. 3 is a flowchart for a method of location-related promotional message display with search query results according to an embodiment.

FIG. 3 is a flowchart for a method of displaying a location-related promotional message with search query results according to an embodiment 20. In some implementations, a system embodiment of FIG. 1 may be suitable for performing a method, such as embodiment 20 of FIG. 3, although nothing prevents performing alternate arrangements of components in other implementations. Embodiments may include blocks additional to those shown and described, fewer blocks, blocks occurring in an order different from FIG. 3, or any combination thereof.

Method embodiment 20 of FIG. 3 may begin at block 200, at which a search query from a user at an originating location may be received relative or with respect to a location, such as of a client device or platform initiating a search query, for example. Terms of a search query, may pertain to products and/or services about which a user, for example, may be inquiring, such as a "hammer" as described in relation to FIGS. 1 and 2 herein, or may comprise the business names of one or more establishments, such as "Joe's Pizza," or "Los Angeles Zoo and Botanical Gardens." Also at block 200, for example, an Internet protocol address, from which a search query may be received, may be associated with a physical location, such as a street address or perhaps some other identifying attributes which may, at least in part, enable a search engine to generate a location, such as associated with a client device, for example. It should be noted that many types of queries may be submitted, and/or locations may be estimated through different computational processes. It is not intended that claimed subject matter be not limited in scope in this respect.

At block 210, an ordered list of universal resource locators (URLs) in response to a search query may be generated, for example. In implementations, search results may include a brief extract of content of a website highlighting search terms, for example, and/or other contexts, such as in which search terms may be used at universal resource locators returned by a search engine. It should be noted, however, that search engines may return results in a variety of formats, such as lists in which results are displayed in descending order of relevance. Of course, claimed subject matter is not limited to any particular representation of search results.

At block 220, one or more processors, for example, as previously described, may determine presence of establishments having a geographical relationship with establishments determined at block 210. In certain implementations, a first establishment may possess a geographical relationship with a second establishment provided in search results if a first establishment is located nearby or otherwise geographically relevant (e.g., proximate), such as within a few kilometers, of a second establishment, and/or if a first establishment is located at or nearby a travel route from an estimated location to a second establishment. However, geographical relevance (e.g., a geographical relationship) between establishments may exist for other reasons, and claimed subject matter is not limited in scope to this example illustration.

At block 230, one or more processors, for example, may search a promotional message index for promotional messages for establishments having a geographical relationship with an establishment listed in one or more search results, for example. If one or more promotional messages are located within a message index, which may imply that a fee for presentation of the promotional message has been paid to a search engine provider, one or more promotional messages may be displayed with results of a search query, for example, as in block 240.

In particular implementations, a promotional message index may comprise information states corresponding to the text, font, and/or other aspects, that may specify precisely content and/or layout of a promotional message along with a rule set, for example, which may affect aspects of a promotional message to be displayed, such as, for example, how many times a promotional message is to be displayed, the times of day a promotional message is to be displayed, days of the week a promotional message is to be displayed, and so forth. In one possible example, among many possible examples, a promotional message for a restaurant specializing in a lunch buffet may be specified to be displayed during hours leading up to lunchtime. Thus, a rule set of a message index may comprise one or more dynamic components, which may allow an owner and/or operator of an establishment, for example, to incur costs associated with displaying a promotional message at selected times, such as during desirable and/or profitable times during the day, for example. It should be noted, however, that a message index may comprise other rule sets in place of, or in addition to, the aforementioned. Thus, claimed subject matter is not limited in scope to this example illustration. Likewise, a variety of ways to implement an index like operation are possible. Therefore, again, claimed subject matter is not necessarily limited in scope to use of a search index and/or a promotional message index in the manner previously described, for example.

In some implementations at least, a rule set may affect display of a promotional message based, at least in part, on complementary attributes, such as goods and/or services, of first and/or second establishments in addition to a geographical relationship. In one possible example, among many possible examples, if a result of a search query comprises a particular automobile tire and/or service center, a rule set may lead to display of a second establishment with attributes related to tire-related accessories, for example, such as establishments that sell tire cleaners, tire pressure gauges, tire pumps, repair kits, tire hub and rim polishes, etc. In certain implementations, a rule set may be utilized to assign pricing of one or more promotional messages for a first establishment as a function of the proximity of the first establishment to a second establishment provided in search results. In one possible example, among many possible examples, if a result of a search query comprises a particular popular supermarket, a promotional message for an establishment located highly proximate (e.g., closer to) to the popular supermarket may be of relatively high-value. Likewise, a promotional message for an establishment located less proximate (e.g., farther away) than the popular supermarket may be of a lower value.

Pricing models may accord with a variety of techniques, such as a linear model, in which fees for promotional messages increase or decrease linearly as proximity between a first and a second establishment increases or decreases. A pricing model may also accord with second order model, for example, in which fees for promotional messages may increase or decrease as a function of the square of the distance between first and second establishments. It should be noted that claimed subject matter is not limited in this regard as a large variety of pricing models may be adopted for setting fees for promotional messages as a function of geographical relationship between a first and second establishment.

Method embodiment 20 continues at block 250, wherein, perhaps as a result of selection via a client device, such as a mouse click or a touch screen, as non-limiting examples, a map may be displayed. In some implementations at least, a displayed map may provide locations of one or more establishments listed in search query results along with establishments having a geographical relationship (e.g., located proximate) a listed establishment. In some implementations, for example, establishments located along a route from an estimated location to a listed establishment may be displayed on a map.

Figure 4:
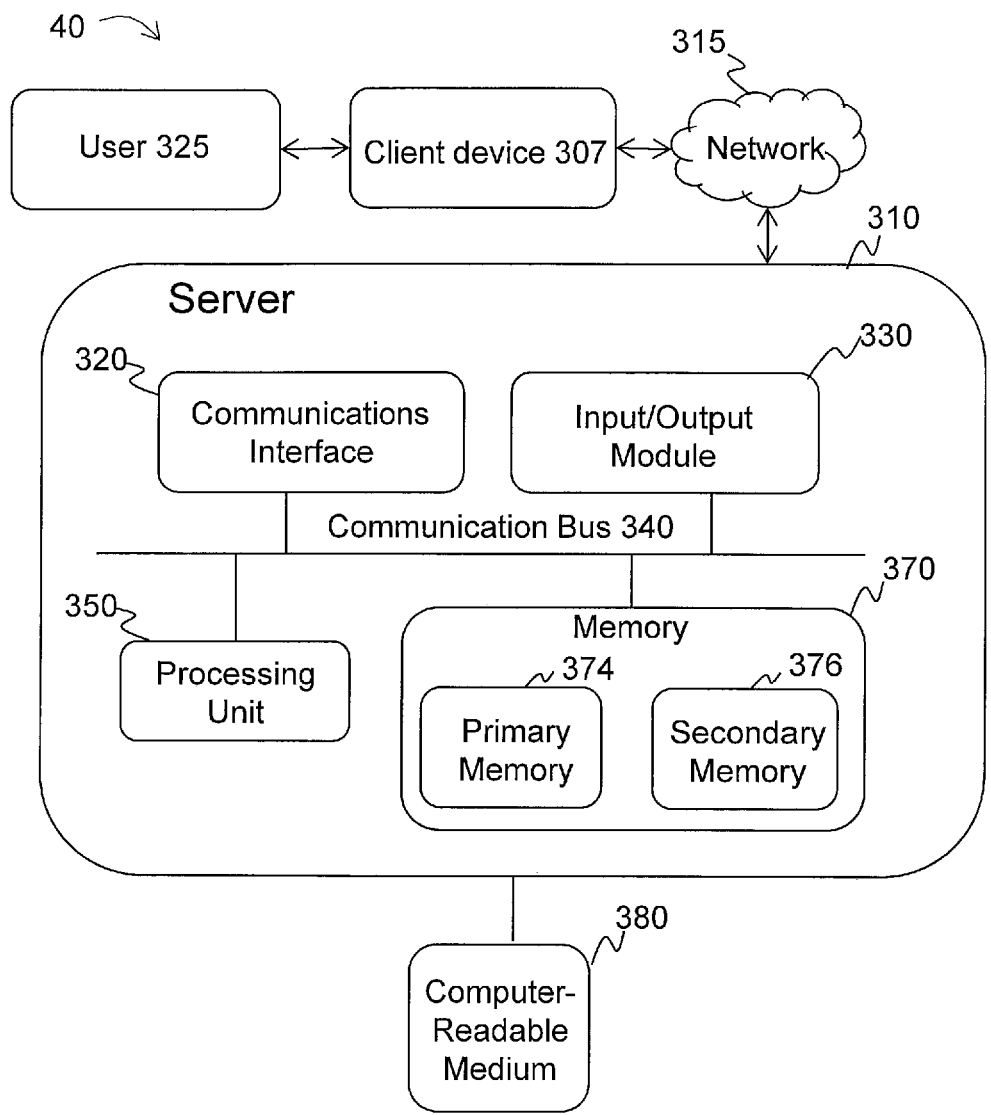
FIG. 4 is a schematic diagram of details of a computing platform for location-related promotional message display with search query results according to an embodiment.

FIG. 4 is a schematic diagram of an embodiment 40 of a computing platform for displaying a location-related promotional message with search query results. In an implementation, for example, a computing platform, such as server 310, may interface with network 315, for example to receive search queries, such as from a client platform or device, such as 307, process search queries, and/or provide results of search queries along with promotional messages, such as, for example, to a client device or platform, such as 307, according to techniques described herein, for example. Communications interface 320, input/output module 330, one or more processors, such as processing unit 350, and memory 370, which may comprise primary memory 374 and secondary memory 376, may communicate by way of communication bus 340, for example. Although the computing platform of FIG. 4 shows the above-identified elements, claimed subject matter is not limited to computing platforms comprising these elements as other implementations may include alternative arrangements that may comprise additional components, fewer components, or components that function differently while achieving similar results.

In an example implementation, user 325 may interface with a computing platform, such as server 310, via a client platform or device, such as 307, to perform a search query resulting from one or more search terms, such as user supplied terms, for example. A processor or processing unit, such as 350, for example, may execute a process, such as to detect universal resource locators, such as for local establishments, that may be relevant to search terms, and which may result in a server, such as server 310, generating electrical signals that represent information states for transmission via network, such as 315, to be displayed to a user, for example, via a client device, such as 307. Processing unit 350 may additionally, for example, access a promotional message index for an establishment having a geographical relationship with one or more local establishments.

Memory 370 may be representative of any storage mechanism. Memory 370 may include, for example, primary memory 374 and secondary memory 376, although nothing prevents use of additional memory circuits, mechanisms, or combinations thereof. Memory 370 may comprise, for example, random access memory, read only memory, or one or more data storage devices or systems, such as, for example, a disk drive, an optical disc drive, a tape drive, a solid state memory drive, just to name a few examples. Memory 370 may be utilized to store information states corresponding to one or more unstructured, semi-structured, or structured forms of electronic content, which may be accessed by processing unit 350 in response to receipt of a search query, for example. Memory 370 may also be utilized to store information states corresponding to one or more unstructured, semi-structured, or structured forms of electronic content, which may, for example, correspond to a promotional message index, for example, for display along with search results. Memory 370 may also be utilized to store information states corresponding to navigation and/or maps, which may, for example, be used by processing unit 350 to compute a route from an estimated location to an establishment listed in results of a search index and/or an establishment having a geographical relationship with a listed establishment, for example, in an embodiment.

Memory 370 may also comprise a memory controller for accessing computer readable-medium 380 that may carry and/or make accessible content, code, and/or instructions, for example, executable by processing unit 350 or some other controller or processor capable of executing instructions, for example. Although computer readable-media 380 is shown in FIG. 4 as detached from server 310, nothing prevents inclusion of the computer-readable media within a computing platform, such as server 310, and claimed subject matter is not limited in this respect.

In implementations, computer readable media may comprise a non-transitory storage medium comprising machine-readable instructions stored thereon which are executable by a special purpose computing device, for example, to display a promotional message for a first establishment, wherein the first establishment may comprise a geographical relationship to a second establishment, and the second establishment may be represented in search results. Machine-readable instructions stored thereon may also result in a computing platform accessing information states from memory locations that may represent a travel route from an estimated location, such as of a user submitting a search query, for example. Machine-readable instructions stored thereon may also result in a computing platform determining whether to display a promotional message for a first establishment if a first establishment is within a specified range of a second establishment, for example. Machine-readable instructions stored thereon may also result in a computing platform displaying a promotional message for a first establishment if attributes of a first establishment may complement attributes of a second establishment. Machine-readable instructions stored thereon may also result in a computing platform determining that attributes of a first establishment complement attributes of a second establishment based, at least in part, on a time of day of submittal of a search query, for example.

A computer-readable (e.g., storage) medium, such as computer-readable medium 380 of FIG. 4, typically may be non-transitory and/or comprise a non-transitory device. In this context, a non-transitory storage medium may include a device that is tangible, meaning that the device has a concrete physical form, although the device or one or more portions thereof may change physical state. Thus, for example, non-transitory refers to a device or one or more portions thereof remaining tangible despite a change in state.

Network 315 may comprise one or more communication links, processes, and/or resources to support exchanging communication signals, such as among users, such as user 325, and server 310. By way of example but not limitation, network 315 may include wireless and/or wired communication links, telephone or telecommunications systems, Wi-Fi networks, Wi-MAX networks, the Internet, the web, a local area network (LAN), a wide area network (WAN), or any combination thereof.

User 325 may make use of a browser utilized to, for example, view or otherwise access content, such as, from the Internet. A browser may comprise a standalone application or an application that is embedded in or forms at least part of another program or operating system, etc. Client resources may also include or present a graphical user interface (GUI). An interface, such as GUI, may include, for example, an electronic display screen or various input or output devices. Input devices may or may not include, for example, a microphone, a mouse, a keyboard, a pointing device, a touch screen, a gesture recognition system (e.g., a camera or other sensor), or any combinations thereof, etc., just to name a few examples. Output devices may include, for example, a display screen, speakers, tactile feedback/output systems, or any combination thereof, etc., just to name a few examples. In an example embodiment, a user may submit a request for content or a request to access content via an interface, although claimed subject matter is not limited in scope in this respect. Signals may be transmitted via client resources, such as a client device, to a server system via a communications network, for example. A variety of approaches are possible and claimed subject matter is intended to cover such approaches.

The term "computing platform" as used herein refers to a system and/or a device that includes a capability to process and/or store data in the form of signals and/or states. Thus, a computing platform, in this context, may comprise hardware, software, firmware or any combination thereof (other than software per se). Computing platforms 100 (of FIG. 1) and server 310 merely represent examples of computing platforms, and claimed subject matter is not limited in scope to these particular examples. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by one or more processing units or processors, such as part of a computing platform, for example.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, and/or characteristic in the singular and/or may be used to describe a plurality or some other combination of features, structures and/or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states stored within a memory of a specific apparatus or special purpose computing device or processing unit. In the context of this particular specification, the term specific apparatus or the like includes a general purpose computing device, such as general purpose computer, once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "determining", "establishing", "obtaining", "identifying", "selecting", and/or the like may refer to actions and/or processes of a specific apparatus, such as a special purpose computing platform and/or a similar special purpose computing device. In the context of this specification, therefore, a special purpose computer and/or a similar special purpose computing device may be capable of manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method comprising:
   executing computer-readable instructions by one or more processing units to:
   generate electrical signals representing a promotional message for a first establishment, the first establishment to have a geographical relationship to a second establishment, wherein the second establishment is to represent, at least in part, results of a search query, the search query to include one or more user-supplied search terms; and
   assign a fee to the promotional message, the fee to be a function of a proximity of the second establishment to the first establishment.

2. The method of claim 1 wherein the geographical relationship is to relate to the first establishment and the second establishment to be mutually geographically relevant.

3. The method of claim 1, wherein the geographical relationship is to relate to proximity of the first establishment with the second establishment.

4. The method of claim 1, wherein the geographical relationship is to relate to the first establishment to be being located along a travel route to the second establishment.

5. The method of claim 1, further comprising:
   executing computer-readable instructions by one or more processing units to:
   generate signals to represent a determination that the promotional message for the first establishment is to be transmitted based, at least in part, on whether search results that include the second establishment are also to be transmitted.

6. The method of claim 1, further comprising:
   executing computer-readable instructions by one or more processing units to:
   generate electrical signals responsive to the one or more processing units to access a memory, the memory to comprise physical memory states to represent a rule set of the promotional message.

7. The method of claim 6, wherein the rule set to direct transmission of the promotional message based, at least in part, on a time of day the search query is initiated.

8. The method of claim 1, further comprising:
   executing computer-readable instructions by one or more processing units to:
   generate electrical signals to represent an estimated location of the search query.

9. The method of claim 1 wherein the promotional message for the first establishment to be displayed based, at least in part, on the search query being initiated during hours of operation of the first establishment.

10. An apparatus comprising:
    a hardware computing device, wherein one or more processing units of the hardware computing device to generate electrical signals for a promotional message of a first establishment, the first establishment to have a geographical relationship to a result of a search query that includes one or more user-supplied search terms, the geographical relationship to include proximity of the first establishment to a second establishment, the second establishment to correspond to the result of the search query, and wherein one or more processing units of the computing device to generate signals to assign a fee to the promotional message, the fee to be a function of proximity of the second establishment to the first establishment.

11. The apparatus of claim 10, wherein the one or more processing units of the hardware computing device to compute a travel route to the first establishment from an estimated location for initiation of the search query.

12. The apparatus of claim 11, wherein the geographical relationship to also include the second establishment to be proximate with a travel route to the first establishment.

13. The apparatus of claim 10, wherein the promotional message to be transmitted if the second establishment comprises attributes complementary to attributes of the first establishment.

14. The apparatus of claim 10, wherein the one or more processing units to generate the promotional message to be based, at least in part, on a time of day that the search query is to be initiated.

15. The apparatus of claim 10, wherein the promotional message to be displayed is to be based, at least in part, on the search query to be initiated during hours of operation of the first establishment.

16. An article comprising:
    a non-transitory storage medium comprising computer-readable instructions stored thereon which are executable by a special purpose computing device to:
    transmit a promotional message for a first establishment if the first establishment is determined to have a geographical relationship to a second establishment, wherein the second establishment is to be represented in search query results, the search query to include one or more user-supplied search terms; and
    generate signals to assign a fee to the promotional message, the fee to be a function of proximity of the second establishment to the first establishment.

17. The article of claim 16, wherein the non-transitory storage medium additionally comprises computer-readable instructions stored thereon which are executable by the special purpose computing device to:
    determine whether the geographical relationship comprises the first establishment to be within a specified range of the second establishment.

18. The article of claim 16, wherein the non-transitory storage medium additionally comprises computer-readable instructions stored thereon which are executable by the special purpose computing device to:
    determine whether attributes of the first establishment complement attributes of the second establishment.

19. The article of claim 18, wherein the non-transitory storage medium additionally comprises computer-readable instructions stored thereon which are executable by the special purpose computing device to:
    transmit the promotional message for the first establishment if the attributes of the first establishment complement the attributes of the second establishment.

20. The article of claim 16, wherein the promotional message for the first establishment to be displayed based, at least in part, on the search query to be initiated during hours of operation of the first establishment.

* * * * *